US00RE41484E

(19) United States
(12) Reissued Patent
Lee et al.

(10) Patent Number: US RE41,484 E
(45) Date of Reissued Patent: Aug. 10, 2010

(54) LIGHT-EMITTING DIODE LIGHT SOURCE CONTROL METHOD

(76) Inventors: Chen-Ho Lee, 4F, No. 53, Lane 1050, Minghu Rd., Hsinchu City (TW); Chin-Lin Chang, 2F, No. 29, Minzu Rd., Xindian City, Taipei County 231 (TW); Shang-Yu Yang, No. 90, Lane 350, Chengguan Rd., Renwu Shieng, Kaohsiung County 814 (TW); Kuan-Yu Lee, 14F-2, No. 287, Section 2, Kwan-fu Road, Hsin-chu City (TW)

(21) Appl. No.: 11/274,711

(22) Filed: Nov. 14, 2005

(Under 37 CFR 1.47)

Related U.S. Patent Documents

Reissue of:
(64) Patent No.: 6,646,770
Issued: Nov. 11, 2003
Appl. No.: 10/105,456
Filed: Mar. 26, 2002

(51) Int. Cl.
*H04N 1/46* (2006.01)
*G09G 3/28* (2006.01)

(52) U.S. Cl. ..... 358/509; 358/474; 358/475; 358/483; 358/448; 345/63; 345/46; 345/76; 345/82

(58) Field of Classification Search ..... 358/509, 358/474, 475, 483, 506, 510, 482, 448, 450; 345/63, 46, 77, 48, 76, 82
See application file for complete search history.

(56) References Cited

U.S. PATENT DOCUMENTS 6,211,975 B1 * 4/2001 Bryant ..... 358/527
6,362,835 B1 * 3/2002 Urbanus et al. ..... 345/692
6,473,062 B1 * 10/2002 Debiez et al. ..... 345/63
6,518,977 B1 * 2/2003 Naka et al. ..... 345/690

* cited by examiner

*Primary Examiner*—Tuyet Vo
(74) *Attorney, Agent, or Firm*—Stolowitz Ford Cowger LLP

(57) ABSTRACT

A light-emitting diode (LED) light source control method is disclosed. The light-emitting diode light source control method is used for controlling a composite and a single color LED light source. The composite color LED light source can provide two of the three original red, green and blue color lights and the single color LED light source provides the third original color. The composite and the single color LED light sources provide illuminations sequentially so that the light sources need not to be turned on continually and the data generated by the composite and the single color lights on the red, green and blue channels of image sensors can be processed sequentially.

20 Claims, 3 Drawing Sheets

LIGHT-EMITTING DIODE LIGHT SOURCE CONTROL METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a light-emitting diode (LED) light source control method, and more particularly to a light-emitting diode light source control method used for controlling a composite and a single color LED light source.

2. Description of the Related Art

Image scanners (image scanning and reading devices) are being increasingly used for the purpose of optically reading a given objective image by use of an image sensor such as a CCD line sensor and outputting image signals to various image processing devices including a computer, a copying machine and a facsimile. A cold-cathode fluorescent lamp (CCFL), which is generally used as a light source in the image scanner, suffers the disadvantage that the cold-cathode fluorescent lamp always needs a preheating time before operation and this preheating time definitely retards the scanning speed of the image scanner. Light-emitting diodes (LED) that emit white light may be used as a replacement of the cold-cathode fluorescent lamp, but the high cost and the always-on illumination of the white light LEDs are still problems to be overcome since the always-on illumination degrades the performance of the LEDs and reduces their life times.

FIG. 1 shows a conventional light-emitting diode light source control method controlling a white light-emitting diode as a light source. As in FIG. 1, the white light LED is always turned on and most of the light energies are wasted amid any single time interval since only one channel of one color of image sensors is responsive and the data of one color are processed in one time interval.

FIG. 2 shows another conventional light-emitting diode light source control method controlling red, green and blue color light-emitting diodes as light sources. The method turns on the red color light-emitting diode and processes the data generated by the illumination of the blue color light-emitting diode during time interval $T_1$. Then the red color light-emitting diode is tuned off and the green color light-emitting diode is turned on and the data generated by the illumination of the red color light-emitting diode during time interval $T_2$. Next the green color light-emitting diode is turned off and the blue color light-emitting diode is turned on and the data generated by the illumination of the green color light-emitting diode during time interval $T_3$. This method is apparently more complex and presents more cost since more kinds of light-emitting diode and control circuits are involved.

In view of the drawbacks related to the prior art, there is a continued need to develop a new light-emitting diode light source control method that overcomes the disadvantages associated with the prior art. The requirements of this invention are that it solves the problems mentioned above.

SUMMARY OF THE INVENTION

It is therefore an object of the invention to provide a new light-emitting diode (LED) light source control method that can save more electrical power and prolong the life time of the LED light source.

It is another object of this invention to a new light-emitting diode (LED) light source control method that utilizes pulse to drive the LED light source.

It is yet another object of this invention to provide a new light-emitting diode (LED) light source control method with the benefits of environment protection and low cost.

To achieve these objects, and in accordance with the purpose of the invention, the invention provides a light-emitting diode light source control method used for controlling composite and single color light-emitting diodes as a light source. The method comprises the following steps. First of all, the composite color light-emitting diodes are turned on and data generated by the illumination of the single color light-emitting diodes are processed. Then data of a first color generated by the illumination of the composite color light-emitting diodes are processed while the composite color light-emitting diodes are still on. Next the composite color light-emitting diodes are turned off, the single color light-emitting diodes are turned on and data of a second color generated by the illumination of the composite color light-emitting diodes are processed. Then the single color light-emitting diodes are turned off while the composite color light-emitting diodes are turned on again and the scanning cycle set forth is performed repeatedly.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the system and method described below do not cover a complete system and method.

The present invention can be practiced in conjunction with various software and hardware that are used in the art, and only so much of the commonly practiced components and steps are included herein as are necessary to provide an understanding of the present invention.

The present invention will be described in detail with reference to the accompanying drawings. It should be noted that the drawings are in greatly simplified form.

The invention utilizes composite color light-emitting diodes together with single color light-emitting diodes as the light source of an image scanner. The composite color light-emitting diode comprises any two of the original colors, red, green and blue. For example, to provide a light source with equivalent red, green and blue color, a combination of a yellow color light-emitting diode and a blue color light-emitting diode may be used. As the yellow color light-emitting diode is turned on, the red channel and the green channel of image sensors such as charge-coupled devices (CCD) or complementary metal oxide semiconductor transistors (CMOS) would receive light energies with frequencies of red light and green light respectively and generally the correspondent voltages as well as image data. As the blue color light-emitting diode is turned on, the blue color light-emitting diode emits the light energy with frequency of blue light so as to generate a correspondent voltage on the blue channel of the image scanner. Other light source combination of a composite color light-emitting diode and a single color light-emitting diode can also be applied.

Figure 1:
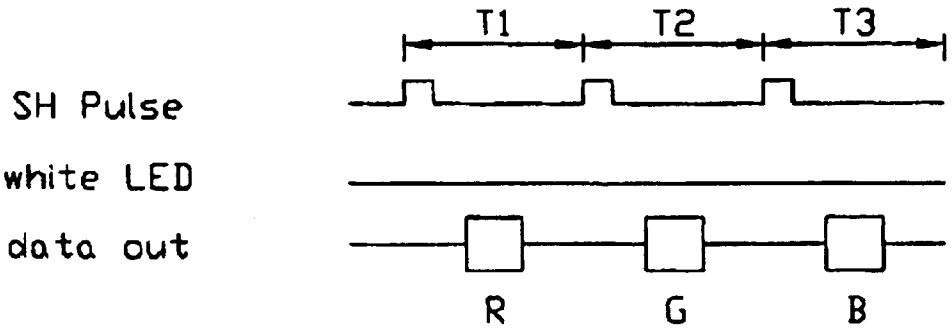
FIG.1(Prior Art)
FIG. 1 shows a conventional light-emitting diode light source control method controlling a white light-emitting diode as a light source.
Figure 2:
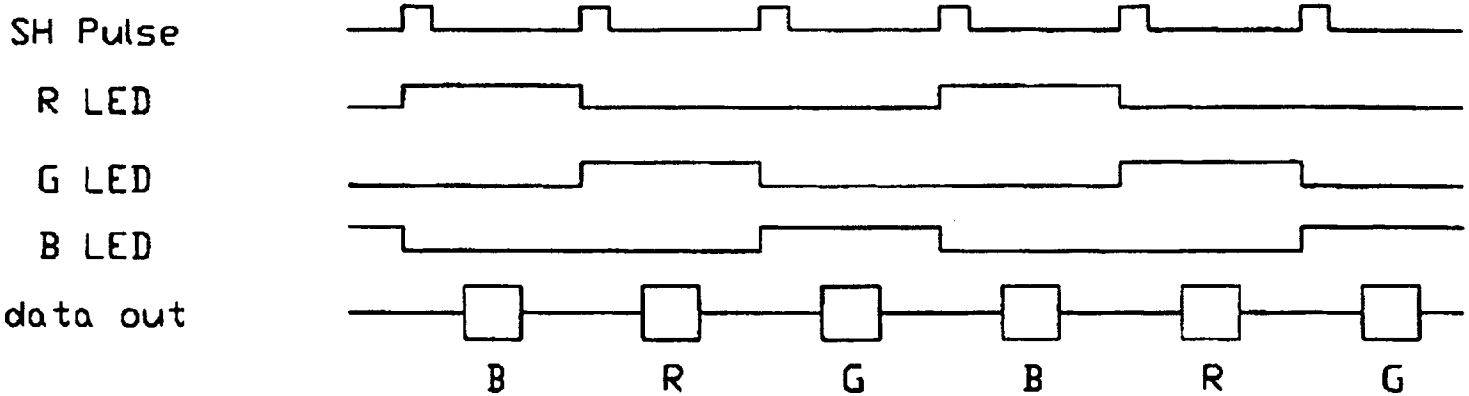
FIG.2(Prior Art)
FIG. 2 shows another conventional light-emitting diode light-source control method controlling red, green and blue light-emitting diodes as light sources.
Figure 3:
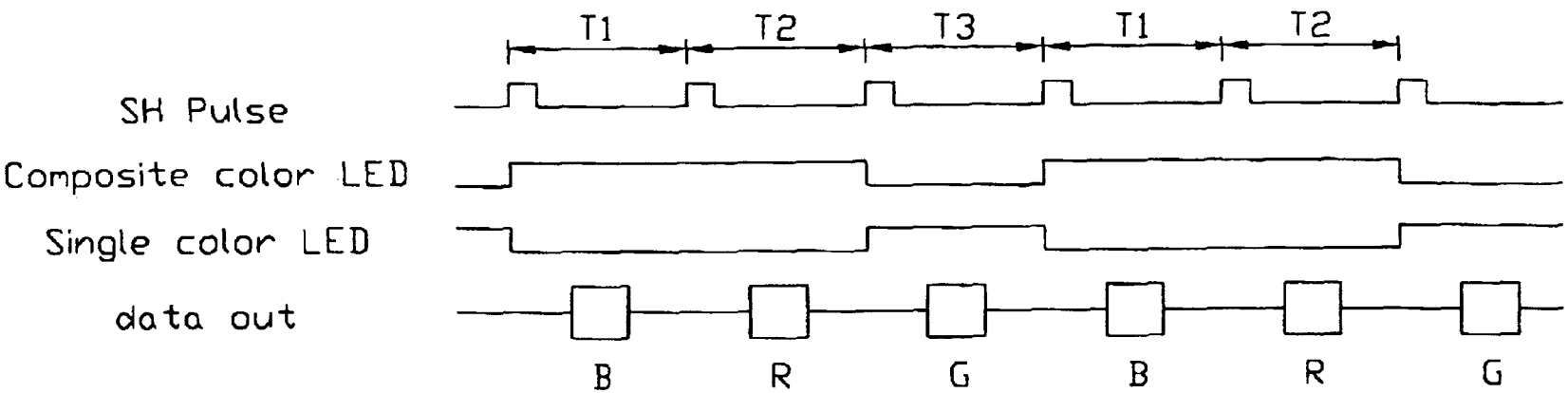
FIG. 3 shows an example of the light-emitting diode light source control method controlling a composite and a single color light-emitting diode as a light source.

The example of the light-emitting diode light source control method controlling a composite and a single color light-emitting diode as a light source as shown in FIG. 3. The composite color light-emitting diode is a yellow color light-emitting diode and the single color light-emitting diode is a blue color light-emitting diode. As shown in FIG. 3, the yellow color light-emitting diode is turned on during $T_1$ and $T_2$, and the blue color light-emitting diode is turned on during $T_3$, wherein $T_1$, $T_2$ and $T_3$ are time intervals. During $T_1$, a red channel of image sensors receives a light energy with the frequency of red light and the data generated on a blue channel of the image sensors by the illumination of the blue color light-emitting diode previously turned on are processed. During $T_2$, the yellow color light-emitting diode is still turned on and a green channel of image sensor receives a light energy with the frequency of green light and the data generated on the red channel of the image sensors by the illumination of the yellow color light-emitting diode during $T_1$ are also processed. During $T_3$, the yellow color light-emitting diode is turned off and the blue color light-emitting diode is turned on. A blue channel of image sensor receives a blue light energy and the data generated on the green channel of the image sensors by the illumination of the yellow color light-emitting diode during $T_2$ are processed. The total scanning time T of the composite and single color light source equals to $T_1$ plus $T_2$ and plus $T_3$, that is, $T=T_1+T_2+T_3$.

Figure 4:
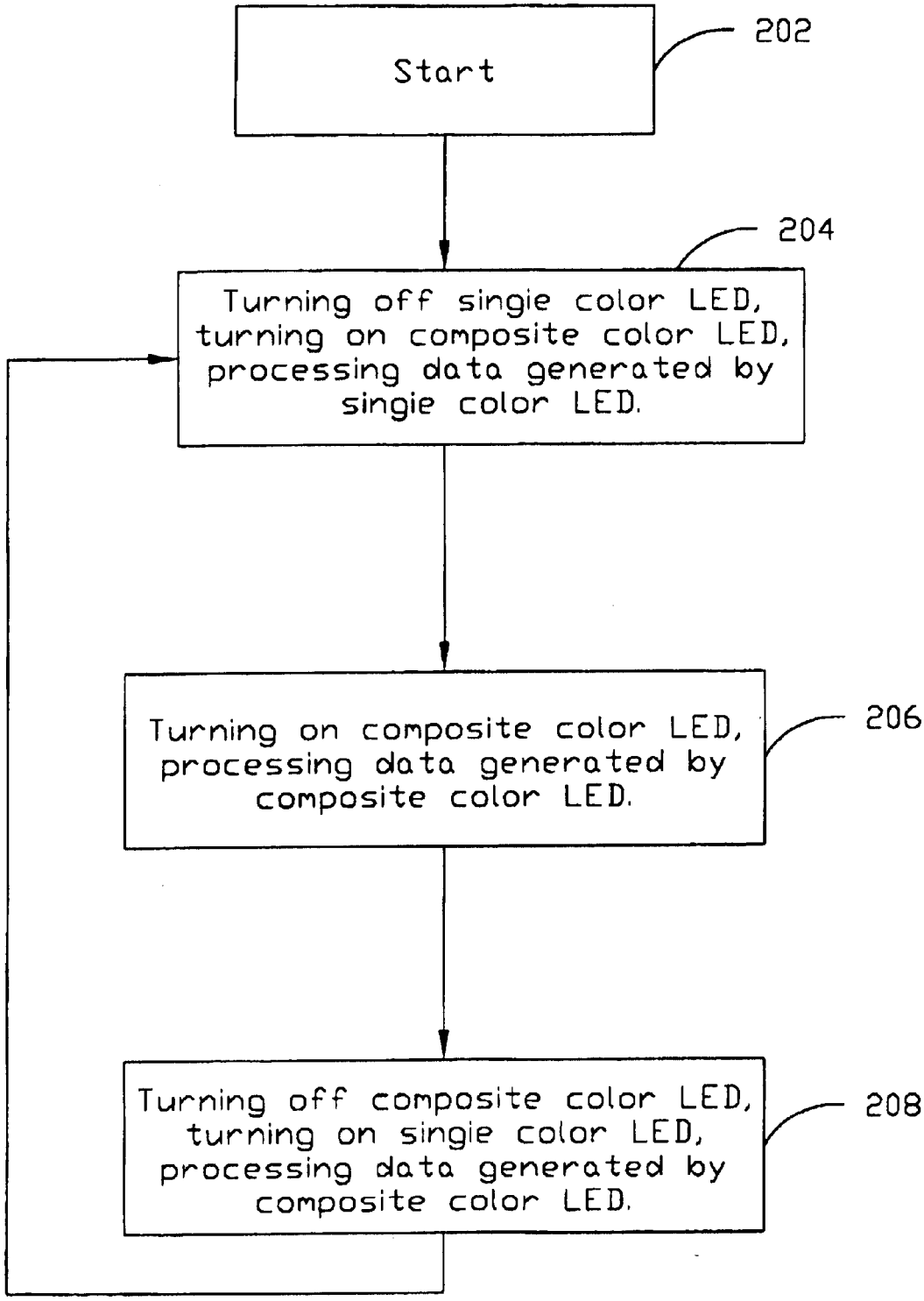
FIG. 4 shows the flow chart of the light-emitting diode light source control method.

FIG. 4 shows the flow chart of the light-emitting diode light source control method. The image scanner starts to scan a document by using composite and single color light-emitting diodes as a light source in step 202. Then the composite color light-emitting didoes are turned on and the data generated on the single color channel of the image sensors by the illumination of the single color light-emitting diodes are processed in step 204. Next the composite color light-emitting didoes are still on and the data generated on the image sensors by the illumination of the composite color light-emitting diodes are processed in step 206. Then the composite color light-emitting diodes are turned off and the single color light-emitting diodes are turned on, and the data generated on the image sensors by the illumination of the composite color light-emitting diode are processed in step 208. A scanning cycle across the document to form an image line of the document is completed through step 204, 206 and 208.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claim is:

1. A light-emitting diode light source control method used for controlling composite *color light-emitting diodes* and *at least one* single color light-emitting [diodes] *diode* as a light source, said method comprising:

turning on the composite color light-emitting diodes and processing data generated by [the] *an* illumination of the *at least one* single color light-emitting [diodes] *diode*;

processing data of a first color generated by [the] *an* illumination of the composite color light-emitting diodes while the composite color light-emitting diodes *are* still on;

turning off the composite color light-emitting diodes, turning on the *at least one* single color light-emitting [diodes] *diode* and processing data of a second color generated by the illumination of the composite color light-emitting didoes; and turning off the *at least one* single color light-emitting [diodes] *diode* while turning on the composite color light-emitting diodes again.

2. The method according to claim 1, wherein said first color and said second color comprise red and green, and *wherein* said *at least one* single color light-emitting diode comprises a blue color light-emitting diode.

3. The method according to claim 1, wherein said first color and said second color comprise red and blue, and *wherein* said *at least one* single color light-emitting diode comprises a green color light-emitting diode.

4. The method according to claim 1, wherein said first color and said second color comprise green and blue, and *wherein* said *at least one* single color light-emitting diode comprises a red color light-emitting diode.

5. A light-emitting diode light source control method used for controlling composite *color light-emitting diodes* and *at least one* single color light-emitting [diodes] *diode* as a light source, said method comprising:

turning on the composite color light-emitting diodes and processing data generated by [the] *an* illumination of the *at least one* single color light-emitting [diodes] *diode*;

processing data of red color generated by [the] *an* illumination of the composite color light-emitting diodes while the composite color light-emitting diodes *are* still on;

turning off the composite color light-emitting diodes, turning on the *at least one* single color light-emitting [diodes] *diode* and processing data of a color generated by the illumination of the composite color light-emitting diodes; and turning off the *at least one* single color light-emitting [diodes] *diode* while turning on the composite color light-emitting diodes again.

6. The method according to claim 5, wherein said color comprises blue, and *wherein* said *at least one* single color light-emitting diode comprises a green color light-emitting diode.

7. The method according to claim 5, wherein said color comprises green, and *wherein* said *at least one* single color light-emitting diode comprises a blue color light-emitting diode.

8. A light-emitting diode light source control method used for controlling composite *color light-emitting diodes* and *at least one* single color light-emitting [diodes] *diode* as a light source, said method comprising:

turning on the composite color light-emitting diodes and processing data generated by [the] *an* illumination of the *at least one* single color light-emitting [diodes] *diode*;

processing data of green color generated by [the] *an* illumination of the composite color light-emitting diodes while the composite color light-emitting diodes *are* still on;

turning off the composite color light-emitting diodes, turning on the *at least one* single color light-emitting [diodes] *diode* and processing data of a color generated by the illumination of the composite color light-emitting diodes; and turning off the *at least one* single color light-emitting [diodes] *diode* while turning on the composite color light-emitting diodes again.

9. The method of claim 8, wherein said color comprises blue, and *wherein* said *at least one* single color light-emitting diode comprises a red color light-emitting diode.

10. The method according to claim 8, wherein said color comprises red, and *wherein* said *at least one* single color light-emitting diode comprises a blue color light-emitting diode.

11. A light-emitting diode light source control method used for controlling composite *color light-emitting diodes* and *at least one* single color light-emitting [diodes] *diode* as a light source, said method comprising:

turning on the composite color light-emitting diodes and processing data generated by [the] *an* illumination of the *at least one* single color light-emitting [diodes] *diode*;

processing data of blue color generated by [the] *an* illumination of the composite color light-emitting diodes while the composite color light-emitting diodes *are* still on;

turning off the composite color light-emitting diodes, turning on the *at least one* single color light-emitting [diodes] *diode* and processing data of a color generated by the illumination of the composite color light-emitting diodes; and turning off the *at least one* single color light-emitting [diodes] *diode* while turning on the composite color light-emitting diodes again.

12. The method according to claim 11, wherein said color comprises green, and *wherein* said *at least one* single color light-emitting diode comprises a red color light-emitting diode.

13. The method according to claim 11, wherein said color comprises red, and *wherein* said *at least one* single color light-emitting diode comprises a green color light-emitting diode.

14. A light-emitting diode light source control method used for controlling composite and single color light-emitting diodes as a light source of the [three] original colors, said method comprising:

turning on yellow color light-emitting diodes and processing data generated on blue channels of image sensors by [the] *an* illumination of blue color light-emitting diodes [on];

processing data of red color generated on red channels of the image sensors by [the] *an* illumination of the yellow color light-emitting diodes while the yellow color light-emitting diodes *are* still on;

turning off the yellow color light-emitting diodes, turning on the blue color light-emitting diode and processing data of green color generated on green channels of the image sensors by the illumination of the yellow color light-emitting diodes; and turning off the blue color light-emitting diodes while turning on the yellow color light-emitting diodes again.

*15. A method comprising:*

*turning on a composite color light-emitting diode;*

*processing first color data generated by an illumination of a single color light-emitting diode, wherein the first color data is processed while the composite color light-emitting diode is turned on;*

*processing second color data generated by an illumination of the composite color light-emitting diode, wherein the second color data is processed while the composite color light-emitting diode is on; and*

*processing third color data generated by the illumination of the composite color light-emitting diode.*

*16. The method of claim 15, further comprising:*

*turning off the composite color light-emitting diode, wherein the third color data is processed while the composite color light-emitting diode is off.*

*17. The method of claim 15, wherein the composite color light-emitting diode emits frequencies of light corresponding to both the second and third color data.*

*18. The method of claim 15, wherein the first, second, and third color data each comprise data associated with a different primary color.*

*19. The method of claim 15, further comprising:*

*turning off the single color light-emitting diode, wherein the second color data is processed while the single color light-emitting diode is off.*

*20. The method of claim 19, further comprising:*

*turning on the single color light-emitting diode, wherein the third color data is processed while the single color light-emitting diode is on.*

* * * * *

UNITED STATES PATENT AND TRADEMARK OFFICE

CERTIFICATE OF CORRECTION

PATENT NO. : RE41,484 E
APPLICATION NO. : 11/274711
DATED : August 10, 2010
INVENTOR(S) : Lee et al.

It is certified that error appears in the above-identified patent and that said Letters Patent is hereby corrected as shown below:

Column 4, line 18, in Claim 1, delete “didoes;” and insert -- diodes; --.

Column 5, line 13, in Claim 9, delete “of” and insert -- according to --.

Column 6, line 12, in Claim 14, delete “diode” and insert -- diodes --.

Signed and Sealed this
Third Day of April, 2012

David J. Kappos

David J. Kappos
*Director of the United States Patent and Trademark Office*